3,655,578
Patented Apr. 11, 1972

3,655,578
HIGH SURFACE AREA STABILIZED SILICA SOLS AND PROCESS FOR PREPARING SAME
Paul C. Yates, Wilmington, Del., assignor to E. I. du Pont de Nemours and Company, Wilmington, Del.
No Drawing. Filed May 8, 1969, Ser. No. 823,184
Int. Cl. B01j *13/00;* C01b *33/14*
U.S. Cl. 252—313 S     14 Claims

ABSTRACT OF THE DISCLOSURE

Compositions consisting essentially of colloidal silica sols having a surface area of from 500 m.$^2$/gram to 1500 m.$^2$/gram stabilized with a co-stabilizer system consisting of: (1) an organic or inorganic base having a basic dissociation constant greater than $10^{-5}$ and (2) at least one non-aromatic organic compound having (a) only hydrogen, carbon, and oxygen, (b) at least two oxygen atoms per molecule in the form of hydroxy or ether groups and (c) a water solubility at 25° C. of at least 1%, are useful as refractory film-forming and binding agents. The non-aromatic organic compound may be a sugar, an aliphatic polyol, polyvinyl alcohol or a methyl ether of any of the preceding compounds. The compositions are made by treating an aqueous silicate solution with an ion-exchange resin in the presence of the co-stabilizing agent until the pH is in the range of 10 to 11.5 and the mole ratio of SiO$_2$ to alkali metal oxide is greater than 5:1.

BACKGROUND

Silica sols stabilized with bases, such as ammonia, sodium hydroxide, potassium hydroxide, lithium hydroxide, low molecular weight organic amines, and quaternary ammonium hydroxide are known in the art. The object of this invention is to make silica sols which are stable at higher surface areas or at higher silica concentrations for a given surface area than those heretofore previously known. The objective is accomplished by stabilizing a silica sol with both a base and a polyoxygen-containing material.

Because of their higher concentrations and surface areas, compositions of the present invention are more efficient as binders than otherwise identical compositions of the prior art stabilized by bases alone. Depending on the amount of costabilizing, polyoxygen-containing material present, the surface areas of the compositions of this invention can range from 50% to several times higher than prior art compositions containing a comparable concentration of silica and stabilizing base, but not containing the co-stabilizing polyoxygen organic agent.

SUMMARY

This invention is directed to a composition consisting essentially of a silica sol having (i) a surface area of from 500 m.$^2$/gram to 1,500 m.$^2$/gram, (ii) up to 30% by weight, of SiO$_2$, and (iii) a mole ratio of SiO$_2$ to alkali metal oxide greater than 5:1, the sol being stabilized by a co-stabilizing system consisting of:

(1) At least one non-aromatic organic compound having (a) only hydrogen, carbon, and oxygen atoms, (b) at least two oxygen atoms per molecule in the form of hydroxy or ether groups, and (c) a water solubility at 25° C. of at least 1%, the compound being present in an amount ranging from 0.01 mole to about 2.0 moles per kilogram of composition, and (2) A water soluble inorganic or organic base having a dissociation constant greater than about $10^{-5}$, the base being present in an amount sufficient to maintain the pH of the composition in the range of from 10.0 to no greater than 11.5.

Process for preparing composition

The compositions of this invention can be made by treating an aqueous solution of a silicate selected from the group consisting of:

(I) an alkaline ionic silicate of a monovalent organic base having a basic dissociation constant greater than $10^{-3}$,
(II) an alkaline ionic silicate of a monovalent inorganic base having a basic dissociation constant greater than $10^{-3}$, and
(III) mixtures thereof, said solution containing up to 30%, by weight, of SiO$_2$ with an ion-exchange resin in the presence of a co-stabilizing agent until:

(A) the pH is in the range of from 10.0 to 11.5, and
(B) the mole ratio of SiO$_2$ to alkali metal oxide is greater than 5:1, the co-stabilizing agent being a non-aromatic organic compound having (a) only hydrogen, carbon, and oxygen atoms, (b) at least two oxygen atoms per molecule in the form of hydroxy or ether groups, and (c) a water solubility at 25° C. of at least 1%, the co-stabilizing agent being present during the treating in a sufficient amount such that the final concentration of co-stabilizing agent is in the range of from 0.01 mole to 2.0 moles per kilogram of composition. The mole ratio of SiO$_2$ to the oxides of alkali metal stabilizing bases must be greater than 5 to 1 and preferably greater than 10 to 1.

(A) Silicates.—The silicates used in the process of this invention can be alkaline ionic silicates of monovalent organic or inorganic bases having a basic dissociation constant greater than $10^{-3}$. Exemplary of such silicates are sodium silicate, potassium silicate, lithium silicate, guanidine silicate, tetramethyl ammonium silicate, tetraethanol ammonium silicate, and silicates or high surface area silica sols stabilized with organic amines such as dimethyl amine, ethanol amine, diethyl amine, and mixtures thereof. For economic reasons, the preferred silicate is sodium silicate. Silicates of the monovalent bases are readily available from commercial sources and include solutions of sodium silicate having mole ratios of SiO$_2$ to Na$_2$O of 1:1, in the case of sodium metasilicate, to as high as about 3.9:1. Their usual concentration ranges from 20% SiO$_2$ to as high as 30% SiO$_2$. All such commercially available silicates are suitable as starting materials for the processes of this invention.

(B) Co-stabilizing agent.—The co-stabilizing agents used in the present invention are non-aromatic organic compounds having (a) only hydrogen, carbon, and oxygen atoms, (b) at least two oxygen atoms per molecule in the form of hydroxy or ether groups, and (c) a water solubility at 25° C. of at least 1%. Representative of compounds which can be used as the co-stabilizing agent are:

(1) various types of sugars such as sucrose, dextrose, levulose, and glucose;
(2) aliphatic polyols such as ethylene glycol, glycerol, pentaerythritol, and 1,2-propanediol;
(3) high molecular weight aliphatic polyhydroxy compounds such as polyvinyl alcohols;
(4) ethers prepared from the hydroxy materials listed above such as dimethyl ether of ethylene glycol or monomethyl ether of ethylene glycol.

The most preferred compounds are characterized by having at least two hydroxy or ether functional groups on adjacent carbon atoms in the same molecule in positions such that they are capable of forming a five-membered ring when coordinated by hydrogen bonding to surface silanol groups on the surface of the colloidal amorphous silica constituent of the invention.

The amount of co-stabilizing agent employed will vary and is a function of the surface area desired; the silica concentration; the pH of the system; and the nature of the alkaline ionic silicate used. However, in general, it is desirable to have approximately one oxygen-containing functional group for each square millimicron of silica surface in solution. Thus, the optimum amount of co-stabilizing agent will depend on the number of hydroxy and/or ether groups in the molecule and on the number of moles of co-stabilizer present.

To illustrate this type of relationship specifically, supposing one were to have a 17.8% silica solution having a specific surface area of 820 m.$^2$/gram of silica. The total surface area per 100 grams of solution would then be $17.8 \times 820 \times 10^{+18}$, where the latter figure represents the number of square millimicrons in a square meter of surface. If one then had a one molar solution of the co-stabilizing compound, it would contain $0.6 \times 10^{+23}$ molecules per 100 grams, or 4.1 molecules of stabilizing compound per square millimicron of surface. If this were a compound such as ethylene glycol, for example, with two oxygen-containing alcohol groups per molecule, approximately a ⅛ molar solution would be required to provide single oxygen-containing groups per square millimicron of surface. On the other hand, if one were dealing with sucrose, which contains ten such groups per molecule, a one-fortieth molar solution might be sufficient.

It should be understood, however, that the above relationship is only aproximate, since it does depend on the other factors described above, and as these other factors vary, the amount of co-stabilizing agent which is sufficient to impart the additional stability and higher surface area characteristic of the compositions of the invention may also vary. Thus, from as little as a tenth of an oxygen-containing functional group per square millimicron of surface to as much as ten, or even more, may be employed in the compositions of the invention. Certain organic stabilizing bases used in this invention are in themselves more effective than others in maintaining a high surface area. Thus, it has been found that the amount of surface area for a unit amount of a stabilizing base will be relatively small in the case of ammonia, whereas it is much higher in the case of an organic amine such as dimethylamine, or for certain quaternary ammonium compounds such as tetraethanolammonium hydroxide. Among the inorganic bases it will even be found that some differences exist; for example, lithium hydroxide is a better stabilizing agent at the same concentration than are sodium or potassium hydroxides. Thus, for a given surface area and a given amount of stabilizing base or a given pH, somewhat lower amounts of the co-stabilizing organic oxygen-containing compound can be employed if the stabilizing base is an organic amine such as dimethylamine, or if it is tetraethanolammonium hydroxide or lithium hydroxide. Conversely, somewhat larger amounts would be required if the base is sodium hydroxide, potassium hydroxide, tetramethylammonium hydroxide, ammonia or guanidine hydroxide. In such instances, the highest surface areas for a unit amount of base may require as high a concentration of oxygen-containing functional groups as 10 per square millimicron.

In general, for most reasonable ranges of silica concentration and for most reasonable amounts of stabilizing bases, the concentration of the co-stabilizing polyoxygen-containing compound can range broadly from 0.01 to about 2.0 moles per kilogram of composition and the most preferred range is between 0.05 and 1.0 mole per kilogram.

(C) Monvalent base.—The base present in the composition of this invention can be any water soluble moderately strong or strong monovalent organic or inorganic base having a basic dissociation constant greater than $10^{-5}$. Bases which are weaker than this are not satisfactory because they cannot achieve a pH greater than 10 in aqueous solution unless excessively high concentrations are employed. Among those bases suitable for the purposes of this invention are strong inorganic bases, such as the alkali metal hydroxides, including sodium hydroxide, potassium hydroxide, and lithium hydroxide. Strong organic bases may also be used as long as they are water-soluble; representative strong organic bases include quaternary ammonium bases such as tetramethylammonium hydroxide, tetraethanolammonium hydroxide, tetraethylammonium hydroxide, and guanidine hydroxide. Ammonia and strongly basic water-soluble organic amines are another category of stabilizing bases which are suitable for the purposes of the invention. Representative members of these include ammonia; methyl, ethyl and propylamines, such as dimethyl, diethyl and di-n-propyl amines; and tertiary amines such as trimethylamine. Alkanol amines such as ethanolamine, diethanolamine, and 3-hydroxypropylamine are also suitable for the purposes of this invention.

Because the bases differ substantially in their basic dissociation constants ranging from approximately $10^{-5}$, in the case of ammonia, to substantially completely dissociated bases, in the case of the alkali metal hydroxides, quaternary ammonium bases, or guanidine hydroxide, the relative proportions present in the compositions of the invention can vary over a wide range. In general, however, the amount of base present in the compositions of this invention will vary from an amount sufficient to give a pH of 10.0 to a pH of no greater than 11.5. In the case of fully dissociated bases such as the alkali metal hydroxides or quaternary ammonium hydroxides, the amount of stabilizing base required to give the proper pH may range between a few thousandths of a mole per kilogram of composition, to attain the lower pH, and a few hundredths of a mole, to obtain the higher pH. When the base is an organic amine, which generally has dissociation constants ranging from about $10^{-3}$ to $10^{-4}$, the quantities required will be substantially larger and may range from a few tenths of a mole to several moles per kilogram of composition. The amounts of relatively weak bases, such as ammonia or organic amines of comparably low dissociation constants, required will be somewhat larger and amounts ranging up to several moles per kilogram of composition may be required, particularly to obtain a pH within the higher portion of the allowable pH range.

The base can be supplied to the compositions by the cation of the ionic silicate. The proportion of the base is controlled by the ion exchange resin. As the ion exchange resin picks up cation from the ionic silicate, the concentration of base decreases until the appropriate pH range is reached. Alternatively, the stabilizing base can be supplied in the form of the corresponding basic form of a cation exchange resin. Thus, an ammonia-sucrose stabilized composition can be prepared by mixing sucrose with sodium silicate and deionizing the resulting solution with enough ammonium cation exchange resin to replace the sodium ions with ammonia released from the resin.

When inorganic oxides or hydroxides are used as stabilizing bases, it is necessary that the mole ratio of $SiO_2$ to such bases be brought to a sufficiently high level. The refractory properties of the compositions of the invention are adversely affected by a high concentration of nonvolatile alkali metal oxides. Thus when preparing compositions from alkali-metal silicates, for example, it is necessary to deionize to the extent that the mole ratio of silica to alkali metal oxide is greater than 5 to 1 and preferably in excess of 10 to 1. When operating with the silicates of organic bases or of strongly basic organic amines, it is not necessary to exert such rigid control over the ratio of silica to such bases, since on drying and firing, these bases are thermally decomposed to leave a pure silica residue with excellent refractory properties.

(D) Ion-exchange resins.—Ion-exchange resins suitable for preparing the compositions of this invention are commercially available and any of a variety of such resins are satisfactory. A number of these resins are described in "Ion Exchange Resins," by Robert Kunin, 2nd Ed., John Wiley & Sons, Inc., New York. For example pages 89 through 96 tabulate many of the different types of cation exchange resins available commercially. Generally speaking, all such cation exchange resins will be satisfactory for the purposes of this invention.

The more common commercially available organic cation exchange resins can be classified into two types. The first are called "strong" cation exchange resins, because the hydrogen form of such resins have a large acid dissociation constant, i.e., they are strongly acidic. Such resins are usually characterized by sulfonic acid or phosphonic acid functional groups as the group responsible for the ion-exchange capability. Commonly, such resins are prepared by copolymerizing styrene with various amounts of divinyl benzene, using a vinyl type polymerization catalyst to obtain a resinous product of a size convenient for ion-exchange operations. This resin or polymer is then sulfonated with sulfuric acid to prepare the sulfonic acid derivatives of the styrene and divinyl benzene moieties, and thus introduce the ion-exchange functional group into the resin. Excess acid is removed, the resin washed, and conditioned by soaking in water. This process gives the hydrogen form of a strong acid ion-exchange resin.

The hydrogen resin can be converted to the amine form of a similar structure by contacting it with a concentrated aqueous solution of the organic amine, or with an aqueous solution of the organic aminium salt. Thus, one could contact such a strong acid ion-exchange resin with aqueous dimethylamine, or with an aqueous solution of dimethylaminium hydrochloride. In either event, the aminium ion is adsorbed onto the resin, thus preparing the aminium form of the resin.

After such a resin has been used in preparing the compositions of the invention, it will contain a greater or lesser amount of sodium ions or other strong base cations, and it may be regenerated and reused by contacting it with a solution of a strong acid to regenerate the hydrogen form, a solution of aminium ions to give the aminium form, or with mixtures of the two in various proportions to give mixed hydrogen-aminium regenerated resins.

While the most commonly available organic ion-exchange resins of the strong acid type contain sulfonic acids as their exchanging functional groups, so-called "weak" acid cation exchange resins usually have carboxylic acid functional groups. There are many ways of preparing such weak acid ion-exchange resins, including oxidizing coal or carbon black with nitric acid, reacting a mixture of phenol, acrolein, and the semiamide of oxamic acid, and other procedures. However, the most common method used commercially is to copolymerize either methacrylic or acrylic acid with divinyl benzene. The copolymerization can be catalyzed by a typical vinyl catalyst such as benzoyl peroxide and the required resin thus prepared directly. The polymerization may be conducted either in an emulsion or in an organic solvent system to give the hydrogen form of the resin. The process for preparing the aminium form of these resins is substantially identical with that for preparing the aminium form of the sulfonic acid resins.

A wide variety of less common cation exchange resins may be prepared, such as by the reaction of phosphoric acid instead of sulfuric acid to introduce an alkyl phosphate exchangeable group instead of sulfonic or carboxylic acid groups. Certain inorganic ion-exchange resins such as either naturally-occurring or synthetic zeolytes may also be used for preparing the compositions of the invention. So long as the resin is capable of removing sodium ions or the cations of other strong bases from silicate solutions and does not adversely react with the silicate anions, to form insoluble compounds, they may be employed if desired. However, normally the more commonly occurring strong acid and weak acid ion exchangers of the type described above will be used.

(E) Process conditions.—The preferred process for compositions of this invention is by deionization of an alkaline ionic silicate having a concentration up to 30% $SiO_2$ with either the hydrogen form, the ammonium form, or a mixture of these, of an ion-exchange resin in the presence of a sufficient amount of the organic co-stabilizing agent to fulfill the criteria noted above. Thus, for example, if it were desired to prepare a sodium hydroxide-sugar stabilized composition of the invention, one could start with a sodium silicate solution containing 28% $SiO_2$, and a 3.22:1 mole ratio of $SiO_2$ to $Na_2O$ and dilute this with water to where it contains from 10 to 15% $SiO_2$; thereafter one would add a tenth of a mole of sugar per kilogram of composition; and then deionize the resulting product with the hydrogen form of a cation exchange resin until the sodium ion concentration is in the range of a mole ratio of $SiO_2$ to $Na_2O$ greater than 5:1 and the pH within the range of from 10 to 11.5. The resin could then be separated from the product of the invention and the processes of the invention would be accomplished.

Alternatively, if it were desired to prepare an ammonium stabilized composition of the invention otherwise similar to the composition described above, the ammonium form of the ion exchange resin could be employed rather than the hydrogen form and in this instance deionization could be continued until substantially all of the sodium had been removed from the composition by cation exchange on the resin. Systems stabilized with a mixture of sodium oxide and ammonia could be prepared in a similar way by employing a mixture of hydrogen resin and ammonium resin. Any of the other stabilizing bases useful in the process of the invention, including organic amines, quaternary ammonium hydroxides or guanidine hydroxide, could be substituted by preparing the ion-exchange resin in this form; that is, the guanidinium form of an ion-exchange resin, a dimethylaminium form of such a resin, or a tetraethanolammonium form of such a resin.

A further variant of the process would be to mix one of the above basic materials with the sodium silicate solution and deionize with the hydrogen form of ion-exchange resin. In such instances, it is usually found that the resin is relatively non-selective, and will remove cations from solution in more or less the same proportion as their ratio in the solution.

If it is desired to start with some other silicate rather than sodium silicate, such as potassium silicate, lithium silicate, or guanidine silicate, the same procedures can be employed as discussed above, except that the base stabilizing agent would be the remaining cations in the form of their hydroxides originating with the starting silicate solution, unless they were totally removed by complete deionization with some other cation form of a resin, as also discussed above.

In general, the processes of the invention will be operated between room temperature and 100° C., with temperatures in the range of from about 30° C. to about 60° C. being preferred. It will be noted that although the surface area of the compositions of this invention is quite high, it is substantially lower than would be found with the starting silicate solutions, and that some particle growth during the preparation of the compositions of the invention or subsequent to it will occur. To accelerate this particle growth, a somewhat increased temperature over room temperature is convenient, since this avoids getting to high an excess of surface area in the deionized product over that which it will have when it has reached its equilibrium surface area.

Characterization of the products of the invention

Since the products of this invention have very high surface areas, much higher than those of previously known concentrated stable silica sols, it is difficult to determine their surface areas in the conventional manner. For example, it is almost impossible to isolate, as by drying, the products of the invention from aqueous solution without causing substantial particle growth and loss of surface area, even employing the most stringent precautions detailed in the prior art. It is, however, possible and convenient to determine the surface area of the products of the invention by employing the base titration surface area method developed by G. W. Sears and published in Analytical Chemistry, 28, 1962 (1956). If weak bases, such as ammonia, are present in the system, the weak base will interfere with the surface titration. The interference can be eliminated by diluting to lesst han 6% $SiO_2$, deionizing to remove the weak base with a hydrogen form of a cation exchange resin, and thereafter proceeding with the titration as described in Sears.

Concentrations if silica can be determined by the various procedures conventionaly employed in the art, including evaporation to dryness and fuming with HF, or by molybdic acid colorimetric procedures. Concentrations of inorganic stabilizing bases can be determined by atomic absorption analysis, flame photometry and similar conventional procedures. Concentration of the costabilizing polyoxygen-containing ingredient can be determined by carbon analysis, in the event that the only source of carbon in the solution is such a compound, or it can be determined by specific procedures such as infrared analysis if other carbon-containing compounds such as organic amines or quaternary ammonium compounds are also present. The total base concentration in solution can be determined by titrations with strong acid to a pH of 6, as is conventional in the art.

EXAMPLES

The following examples illustrate the compositions of this invention and the methods for making same. Parts are by weight unless otherwise noted.

Example 1

The ammonium form of a sulfonic acid resin having an ion exchange capacity of 5 milliequivalents per gram of dry resin and consisting of a polystyrene matrix cross-linked with divinyl benzene and sulfonated to give the sulfonic acid ion exchangeable groups, sold under the trade name of "Rexyn" 101 by the Fisher Scientific Co., is prepared by starting with the commercially available hydrogen form and treating twice with 2000 cc. of an aqueous solution containing 300 grams of 28% aqueous ammonia. Two hundred grams of commercially available sodium silicate sold by E. I. du Pont de Nemours & Co. containing 28% $SiO_2$, 8.7% $Na_2O$, and having a mole ratio of $SiO_2$ to $Na_2O$ of 3.22:1, are diluted with 40 grams of water. 20 grams of food grade sucrose is then dissolved therein. The solution is deionized with 250 cc. of wet ammonium resin until the pH of the solution drops from 1.6 to 10.6. The solution is filtered to remove the resin and is treated a second time with 250 cc. of the wet ammonium resin. The sample at this concentration becomes exceedingly viscous, although it does not gell. It is thereafter diluted with water to 10% $SiO_2$. A total of 342 grams of product are recovered. Note that this includes some of the water used for dilution. This solution is substantially free of sodium ions and contains 0.65 mole of ammonium hydroxide per 1000 grams of solution. The surface area of this composition as determined by the base titration procedure of Sears, Analytical Chemistry, 28, 1962 (1956) after removal of the ammonia with a hydrogen cation exchange resin is 1217 m.$^2$/gram.

Example 2

Seven hundred and twenty grams of the sodium silicate used in Example 1 is diluted with 1330 grams of water. Thereafter, 125 grams of commercially available food grade sucrose is dissolved in the solution. The pH of the solution at this point is 11.3. Nine hundred and thirty grams of the hydrogen form of a "Rexyn" 101 resin identical to that used in Example 1 is added and the solution stirred for a period of 15 minutes. The solution is then filtered and the pH is 10.5. Eleven hundred grams of solution are recovered, representing a 76% recovery. The percent $SiO_2$ is 11.8, the percent $Na_2O$ as determined by atomic adsorption analysis is 1.30, giving an $SiO_2$ to $Na_2O$ molar ratio of 9.08. The surface area of this composition as determined by the base titration technique of Sears is 533 m.$^2$/gram.

Example 3

Eight hundred and sixty-six grams of water and 175 grams of commercially available food grade sucrose are mixed and to this solution is added 1000 grams of the sodium silicate used in Example 1. The addition of the sodium silicate is gradual over a period of 50 minutes. Simultaneously with the addition of the sodium silicate solution, 1990 grams of the ammonium form of "Rexyn" 101 sulfonic acid resin, identical to that used in Example 1, are added in small increments, with the proportions of sodium silicate and resin being maintained approximately proportional to the total amounts throughout the addition. The temperature during addition is maintained within the range of from 39 to 45° C., and the resin is added at a rate such that the pH is maintained at 10.3. A water-clear fluid product is obtained by filtration, representing an 80% recovery based on 1630 grams recovered. Chemical analysis indicates that this composition contains 0.40% sodium, 13.80% total solids. The silica content would therefore be 13.26% and the sodium oxide content 0.45%. The mole ratio of $SiO_2$ to $Na_2O$ is approximately 24.6:1. The total titratable base, as determined by titration with standard HCl to a pH of 6, is 0.70 and the ammonium hydroxide concentration is 0.57 mole per kilogram of composition. A base titration determination of the surface area according to the procedure of Sears shows the surface area to be 820 m.$^2$/gram. The molar concentration of sucrose is 0.25 mole per kilogram of composition. As noted above, the pH is 10.3.

Example 4

Sixteen hundred grams of the product of Example 3 are mixed with 866 grams of water, and this is employed as a heel, while 1000 grams of the sodium silicate solution used in Example 1 and 1955 grams of "Rexyn" 101 ammonium resin are fed in over a one hour period. The temperature is maintained at 40 to 45° C. and the pH within the range of from 10.2 to 10.4 by proportional additions of silicate solution and ammonium resin. The pH at the end of this is 10.3 and the addition time is 60 minutes. The product is separated by filtration from the resin and analyzed, and is shown to have a sodium content of 0.41%, a $SiO_2$ content of 15.00%, and a sugar content of 2.53%. This corresponds to 0.074 mole of sugar per kilogram of composition. The surface area as determined by the base titration procedure of Sears is 709 m.$^2$/gram.

Example 5

Two thousand seven hundred grams of the product of Example 4 are mixed with 866 grams of water and 1000 grams of sodium silicate. Thereafter 2005 grams of "Rexyn" 101 ammonium resin are fed in over a 1 hour and 15 minutes period while the temperature and pH are maintained at about 40° C. and 10.35, respectively. After separation by filtration from the resin, 4228 grams of product are recovered and 4128 grams of this are used as a heel, while 1000 additional grams of sodium silicate are fed in along with 2500 grams of "Rexyn" 101 ammonium resin. The pH and temperature conditions are maintained as before. After separation by filtration from the resin, the final pH is found to be 10.3. An analysis of this product shows it to contain 1.23% sugar, which corresponds to 0.036 mole per kilogram of composition, 0.032% sodium, and 17.57% $SiO_2$. The surface area as determined by the base titration procedure of Sears is 671 m.$^2$/gram. The composition is 0.76 molal in total base as determined by an acid base titration, indicating that is contains 0.62 mole of ammonium hydroxide and 0.14 mole of sodium hydroxide per kilogram of composition.

Example 6

Four hundred grams of a 15% $SiO_2$ sodium silicate solution are prepared by dilution of the sodium silicate solution used in Example 1 with the required amount of water. To this are added 11 grams of glycerol. The resulting product is deionized with the hydrogen form of a sulfonic acid ion-exchange resin ("Rexyn" 101 as described in Example 1) until there are 0.20 mole of sodium hydroxide in the solution. The pH at this point is approximately 10.4. The surface area as determined by base titration procedure of Sears is 782 m.$^2$/gram. An otherwise identical solution which does not contain glycerol gels in a very short period of time after deionization, and even prior to this the surface area is more than 50% lower.

Example 7

Employing 400 grams of the 15% $SiO_2$ solution of the previous example and 11.6 grams of ethylene glycol, the deionization is performed as before until the sodium hydroxide concentration is 0.2 mole in the solution. The pH is 10.6. The surface area of this composition is 750 m.$^2$/gram.

Example 8

The procedure of the previous two examples is repeated, except that 7.8 grams of ethylene glycol dimethyl ether are used instead of glycerol or ethylene glycol. After deionization to leave 0.2 mole of sodium hydroxide in solution, the surface area of the resulting product is 725 m.$^2$/gram.

Example 9

Two hundred grams of lithium silicate containing 28% $SiO_2$ and 4.2% lithium oxide ($Li_2O$) are prepared by dissolving proportional quantities of colloidal amorphous silica having a particle size of 15 millimicrons and a specific area of 231 m.$^2$/gram in a lthium hydroxide aqueous solution and heating at a temperature of 90° C. until all of the colloidal amorphous silica has dissolved, and thereafter adjusting the volume of water to give the preceding concentrations. The solution is then diluted with 40 grams of water. Twenty grams of food grade sucrose is dissolved in this solution. The solution is deionized with 250 cc. of wet ammonium cation exchange resin until the pH of the solution drops from 11.6 to 10.5. The wet ammonium resin is prepared by treating the commercially available hydrogen form of sulfonic acid cation exchange resin having an ion-exchange capacity of 5 milliequivalents/gram of dry resin with aqueous ammonia, as described in Example 1. After deionizing, the lithium silicate solution is filtered to remove the resin and the product recovered. Chemical analysis shows it to contain 16% $SiO_2$ and 1.38% $Li_2O$, giving a silica to lithium oxide mole ratio of 5.6. The specific surface area of this material, as determined by the base titration procedure of Sears after deionization with a hydrogen ion-exchange resin to remove the ammonium ions, is 1300 m.$^2$/gram.

Example 10

A solution of guanidine silicate is prepared by mixing an aqueous colloidal amorphous silica sol containing 40% by weight of $SiO_2$ particles having a specific surface area of 231 m.$^2$/gram in a freshly prepared guanidine hydroxide. The guanidine hydroxide is prepared from guanidine carbonate by reacting it in aqueous solution with calcium hydroxide and filtering to separate the precipitated calcium carbonate. The resulting guanidine silicate composition contains 30% $SiO_2$ and 1:1 mole ratio of guanidinium ions to silicate ions. Two hundred grams of this are mixed with 20 grams of glycerol and with 40 grams of water and deionized with 250 cc. of the wet ammonium form of "Rexyn" 101 cation exchange resin prepared as described in Example 1. The resulting stable solution has a pH of 10.6 in comparison with the starting pH of 11.5. Chemical analysis shows it to have a silica concentration of 25% and a guanidine concentration of 20%. The surface area of this material is 1500 m.$^2$/gram as determined by the titration procedure of Sears, after deionizing with "Rexyn" 101 hydrogen form cation exchange resin to remove the interfering ammonium ions.

Example 11

Two thousand grams of 15% $SiO_2$, sodium silicate is prepared by diluting 1000 grams of a 30% $SiO_2$-3.22 $SiO_2/Na_2O$ mole ratio commercial commodity with 1000 grams $H_2O$. This is mixed with 176 grams of ethylene glycol and is deionized with a dimethylamine form of "Rexyn" 101 cation exchange resin prepared by treating the hydrogen form with an excess of 25% aqueous dimethylamine. This solution is treated with an excess of dimethylamine resin until the sodium ion content has dropped below 0.1%. The pH at this point is 11.3. The surface area is 1400 m.$^2$/gram and this product is indefinitely stable on storage at room temperature and is stable for more than 40 days when stored at 60° C.

Uses of the compositions

The compositions of this invention are useful as film-forming and binding agents in a variety of applications. The very high surface areas and their high chemical reactivity enable them to be set rapidly by chemical techniques such as by exposure to carbon dioxide gas, the addition of acids, or other techniques for rapidly adjusting the pH within the range from 6 to 9. In this regard, the compositions of this invention are similar to the silicate compositions of the prior art. However, they possess better water resistance and better refractory properties than do silicate compositions of the art because of their substantially lower concentrations of alkali metal ions. Thus, the compositions of this invention are useful for many refractory purposes where the sodium ion concentration or the concentration of other inorganic cations such as potassium or lithium are too high to make the silicates of the prior art suitable.

The compositions of this invention are useful as binding agents in zinc-rich paints, as high temperature binders for precision investment casting molds, as high temperature binders for inorganic fibers such as glass wool, fiberglass, refractory aluminosilicate fibers, asbestos and the like, and, in general, for almost any application in which the high binding capacity and rapid chemical reactivity hitherto characteristic of alkali metal silicates must be combined with refractory characteristics hitherto only attainable using lower surface area, less reactive, and less efficient conventional colloidal silica sols of the prior art.

What is claimed is:

1. A composition consisting essentially of a sol in water of silica having (i) a surface area of from 500 m.$^2$/gram to 1500 m.$^2$/gram, (ii) up to 30% by weight $SiO_2$, and (iii) a mole ratio of $SiO_2$ to alkali metal oxide greater than 5:1, the sol being stabilized by a co-stabilizing system consisting of:
   (1) at least one non-aromatic organic compound containing at least two oxygen atoms per molecule, being present in an amount ranging from 0.01 mole to about 2.0 moles per kilogram of composition, and selected from the class consisting of sucrose, dextrose, levulose, glucose, ethylene glycol, glycerol, pentaerythritol, 1,2-propanediol, polyvinyl alcohol, and a methyl ether of any of the preceding compounds, and (2) a water soluble inorganic or organic base having a dissociation constant greater than about $10^{-5}$, the base being present in an amount sufficient to maintain the pH of the composition in the range of from 10.0 to 11.5.

2. The composition of claim 1 wherein the base is sodium hydroxide.

3. The composition of claim 1 wherein the organic compound is sugar.

4. The composition of claim 1 wherein the organic compound is ethylene glycol.

5. The composition of claim 1 wherein the organic compound is glycerol.

6. The composition of claim 1 wherein the organic compound is the dimethylether of ethylene glycol.

7. A method for preparing the composition of claim 1 comprising treating a solution in water of a silicate selected from the group consisting of:

(I) an alkaline ionic silicate of a monovalent organic base having a basic dissociation contant greater than $10^{-3}$, (II) an alkaline ionic silicate of a monovalent inorganic base having a basic dissociation contant greater than $10^{-3}$, and (III) mixtures thereof, said solution containing up to 30%, by weight, of $SiO_2$, with a cation-exchange resin in the presence of a co-stabilizing agent until:

(A) the pH is in the range of from 10.0 to 11.5, and (B) the mole ratio of $SiO_2$ to alkali metal oxide is greater than 5:1, the co-stabilizing agent being selected from the class consisting of sucrose, dextrose, levulose, glucose, ethylene glycol, glycerol, pentaerythritol, 1,2-propanediol, polyvinyl alcohol, and a methyl ether of any of the preceding compounds and being present during the treating in a sufficient amount that the final concentration of stabilizing agent is in the range of from 0.001 mole to 2.0 moles per kilogram of composition.

8. The method of claim 7 wheerin the ion-exchange resin is in the hydrogen form.

9. The method of claim 7 wherein the ion-exchange resin is in the aminimum form.

10. The method of claim 7 wherein the silicate is sodium silicate.

11. The method of claim 7 wherein the organic compound is sugar.

12. The method of claim 7 wherein the organic compound is ethylene glycol.

13. The method of claim 7 wherein the organic compound is glycerol.

14. The method of claim 7 wherein the organic compound is the dimethylether of ethylene glycol.

References Cited
UNITED STATES PATENTS

| | | | |
|---|---|---|---|
| 2,383,653 | 8/1945 | Kirk | 252—309 |
| 2,601,352 | 6/1952 | Wolter | 252—313 |
| 2,823,186 | 2/1958 | Nickerson | 252—313 |
| 2,921,913 | 1/1960 | Alexander | 252—313 X |
| 3,004,921 | 10/1961 | Stossel | 252—309 |
| 3,051,657 | 8/1962 | Power | 252—309 X |

RICHARD D. LOVERING, Primary Examiner

U.S. Cl. X.R.

106—38.3, 38.35, 69; 252—317